United States Patent [19]

Ojima et al.

[11] Patent Number: 4,643,382

[45] Date of Patent: Feb. 17, 1987

[54] TELEVISION STAND HAVING A TILT MECHANISM

[75] Inventors: Juji Ojima; Yosiharu Kitamura, both of Aikawa, Japan

[73] Assignee: NHK Spring Co. Limited, Kanagawa, Japan

[21] Appl. No.: 702,125

[22] Filed: Feb. 15, 1985

[30] Foreign Application Priority Data

Feb. 29, 1984 [JP] Japan .............................. 59-29062[U]

[51] Int. Cl.$^4$ .............................................. A47G 29/00
[52] U.S. Cl. ........................................ 248/371; 248/1; 248/292.1
[58] Field of Search ............... 248/397, 371, 372.1, 248/292.1, 1 I, 648, 652, 655, 664, 665, 666, 667, 1; 108/2, 6, 7

[56] References Cited

U.S. PATENT DOCUMENTS

| | | | |
|---|---|---|---|
| 1,847,398 | 3/1932 | Hurych | 108/2 |
| 3,198,460 | 8/1965 | Goettl | 248/665 |
| 3,784,135 | 1/1974 | Owen, Jr. | 248/664 |
| 3,908,560 | 9/1975 | Horner | 108/2 |
| 4,168,050 | 9/1979 | Nerem et al. | 248/397 X |
| 4,427,243 | 1/1984 | Miller | 312/7.2 |
| 4,471,931 | 9/1984 | Covey et al. | 108/6 X |

FOREIGN PATENT DOCUMENTS 58-27188 2/1983 Japan .

Primary Examiner—J. Franklin Foss
Assistant Examiner—David L. Talbott
Attorney, Agent, or Firm—Fleit, Jacobson, Cohn & Price

[57] ABSTRACT

In a television stand secured tiltably to a base stand and provided with a television fixedly put on it, the tilt of the movable member is stopped by the energized force to a movable device by the abutment to the cam surface formed at the movable member or the base stand.

12 Claims, 13 Drawing Figures

FIG. 11
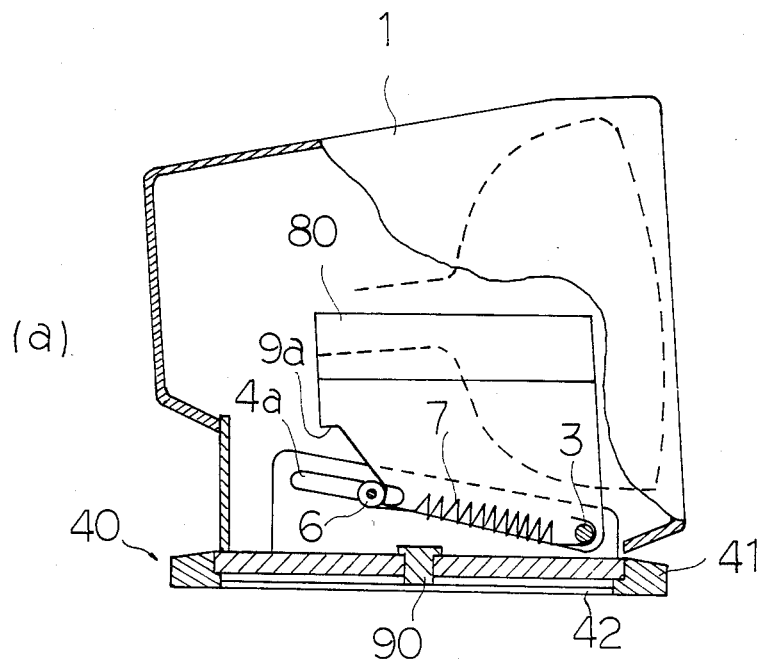
(a)
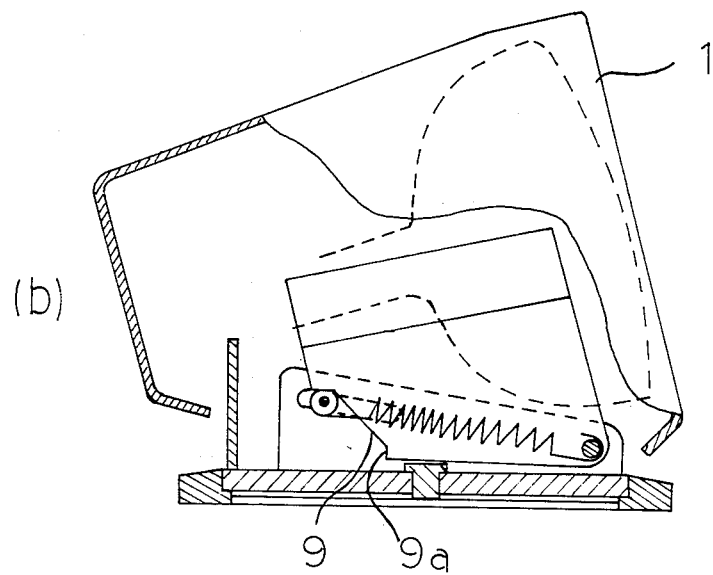
(b)

TELEVISION STAND HAVING A TILT MECHANISM

BACKGROUND OF THE INVENTION

This invention relates to a television stand fixedly put a monitor television or the like thereon, and especially relates to a television stand having a tilt mechanism by which said television can be supported with an arbitary angle.

In quality controls such as a process control, part controlling analysis or the like in a production line of a factory, it is generally performed to observe or to measure by projecting the field, the information and the like on monitor television. In such television it is necessary to set a screen of a Brown tube at the fittest angle for seeing it from the standpoint of biotechnology such as fatigue decrease of an operator, increase of the operation and the like.

Heretofore, for this purpose, the television stand is formed to be able to control as angle of elevation even in a fixed state.

Heretofore, such kind of apparatus, there exists an inclined mechanism having an inclination of display station (U.S. Pat. No. 4,427,243)

This is a parallel type inclined mechanism for a green of the information display controlling disc having a fixed base portion, in which the screen is pivotably attached around a hinged axis in the horizontal direction and a cam having a cam operation surface exists in a surface meets at right angle with said hinged axis is pivotably attached to a frame of the screen side, and further a projection energized with pressure by dint of spring is fixed to the frame of base side. Thus the friction operation force between said cam and the projection is adapted to balance with the operation force due to the gravity which operates to the screen so that said screen may be rotated around said hinged axis in whole inclination position. Since this maintains the screen angle with friction force, when the weight of an object for inclination is large or when the position of center of gravity is out of the hinged axis, a great friction force is requested. Further, in case of controlling an angle degree, together with a great operation force is requested, the maintenance of necessary friction force is difficult for long period due to the large friction of the sliding surface.

Further, said inclination mechanism is different between the pivotably attached center and that of the cam, and the structure and operation thereof are also complicated. Accordingly, said mechanism has a defect of difficulty in design.

SUMMARY OF THE INVENTION

The object of this invention is to provide a television stand which is able to control its degree of angle with a very small operation force and has a tilt mechanism having a small amount of friction loss.

Another object of this invention is to provide a television stand wherein a spring and cams are used as a tilt mechanism to occur nearly the same torque as a moment of rotation due to the weight of the tilted television thereby balancing said weight of the television with the occurred torque.

BRIEF DESCRIPTION OF DRAWINGS

Drawings represent television stands appropriate to perform some embodiments of this invention.

FIG. 11 is an example contained a movable member in a television, wherein said 11(a) is a partially broken side view which shows a mim. inclined degree of angle state of the television and said 11(b) is a partially broken side view which shows a max. inclined degree of angle state of the television.

THE DETAILED DESCRIPTION OF THIS INVENTION

Figure 1:
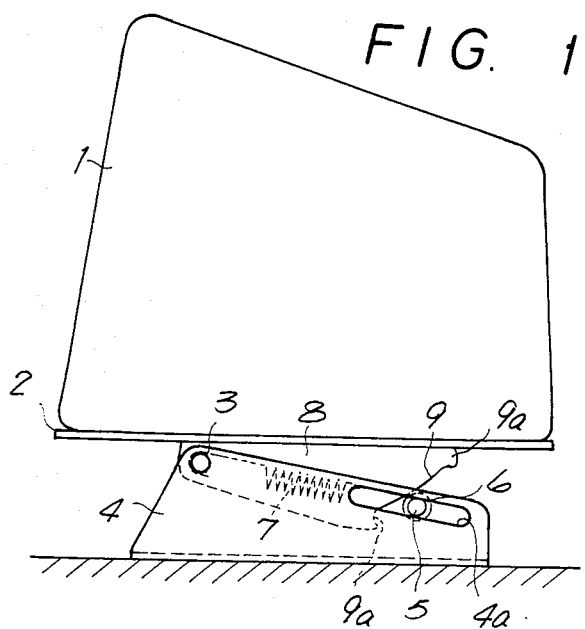
FIG. 1 and FIG. 2 are respectively a side and a rear views which show an embodiment of this invention.
Figure 2:
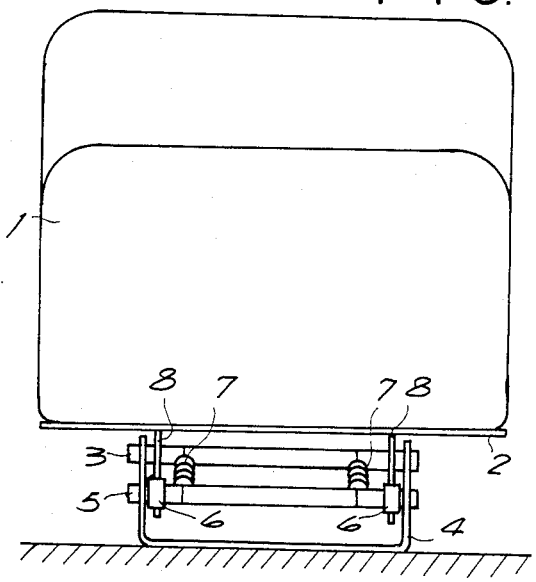

The side view of the television stand of this invention is shown in FIG. 1 and its rear view is shown in FIG. 2. The television 1 is fixedly put on the movable member 2, the movable member 2 is secured to a U type base stand 4 having a pair of standing walls placed on a plane of a disc, floor or the like. A pair of brackets 8 are continuously connected danglingly to both right and left sides at the lower back surface of movable member 2.

In front of the upper portion of said brackets 8, together with an axis 3 being bridged, said axis is supported by the base stand 4, and the movable member 2 is adapted to tilt to the front and the rear with axis 3 as a center.

At the rear portion of said bracket 8 of said movable member, a cam surface 9 having a curved shape is formed. Further, at a pair of standing walls exist at the rear portion of the base stand 4, inclined guide slits 4a, 4a are openly provided. A movable device of this example consists of a shaft inserted into said guide slits 4a, 4a so that both ends of said shaft may be slided to the front and rear directions thereof and rotors 6,6 supported by both inner sides of the standing walls of the base stand 4 of said shaft 5, said rotors 6,6 being energized so as to abut to said pair of cam surfaces 9,9 respectively by dint of a pair of spring 7,7 bridged between said axis 3 and shaft 5. The abutment of rotor 6 to the cam surface 9 in case of tilting of the movable member is performed by the rotation of the rotor 6 along the cam surface 9 which causes by the movement of the cam surface 9 due to the tilt of said movable member 2. In this case, the shaft 5 slides to the front and the rear directions of the slit 4a by being pressed with cam surface 9 rotating along the inner side of the guide slit 4a according to the shape of the cam surface. This sliding is defined so that the rotor 6 may be stopped by the abutment of rotor 6 to the stopper portions 9a, 9a formed at both ends of the cam surface 9 standingly.

The said springs 7,7 are adapted to expand or contract according to the slide of such shaft 5, thereby changing the energized force (torque) to the rotor in accordance with an inclined angle of the movable member 2.

In other words, the torque is balanced so as to be the same as the moment of rotation due to the weight of the television which changes according to the inclination of the movable member 2. For this purpose, the shape of cam surface 9 of the movable member 2 is formed so that the moment of rotation may be balanced with the energized force (torque) of the spring 7.

Further, the weight of television depends upon a kind of television used and the same kind of television shows a nearly same weight. Accordingly, the shape of cam is formed so as to be balanced with the moment of rotation in accordance with the weight of this kind of television.

In this example formed as such, the television 1 inclines to and fro due to the rotation of the movable member 2 with the axis 3 as a center thereof. In this case, the spring 7 expands or contracts according to the movement of cam surface 9 even in any inclined angle, thereby causing the same energized force (torque) as the moment of rotation due to the weight of television to balance each other. Therefore, a stable stopping state can be maintained at an arbitrary position.

Figure 3:
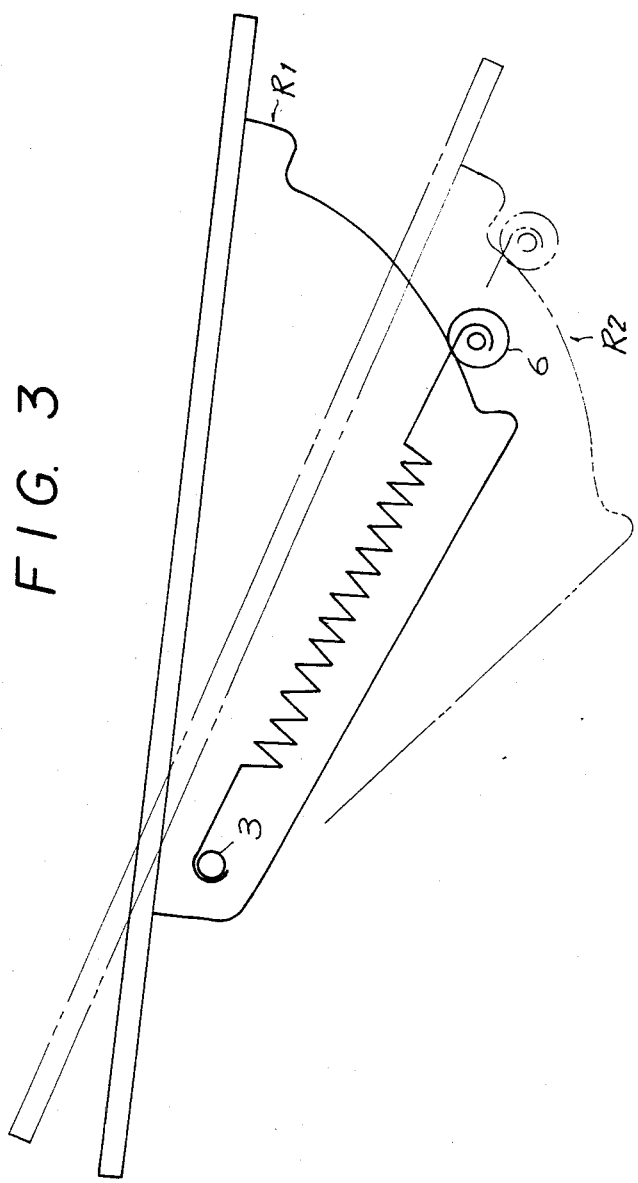
FIG. 3 is a side view which shows operation of a spring with cam surface incorporated in the television stand.
Figure 4:
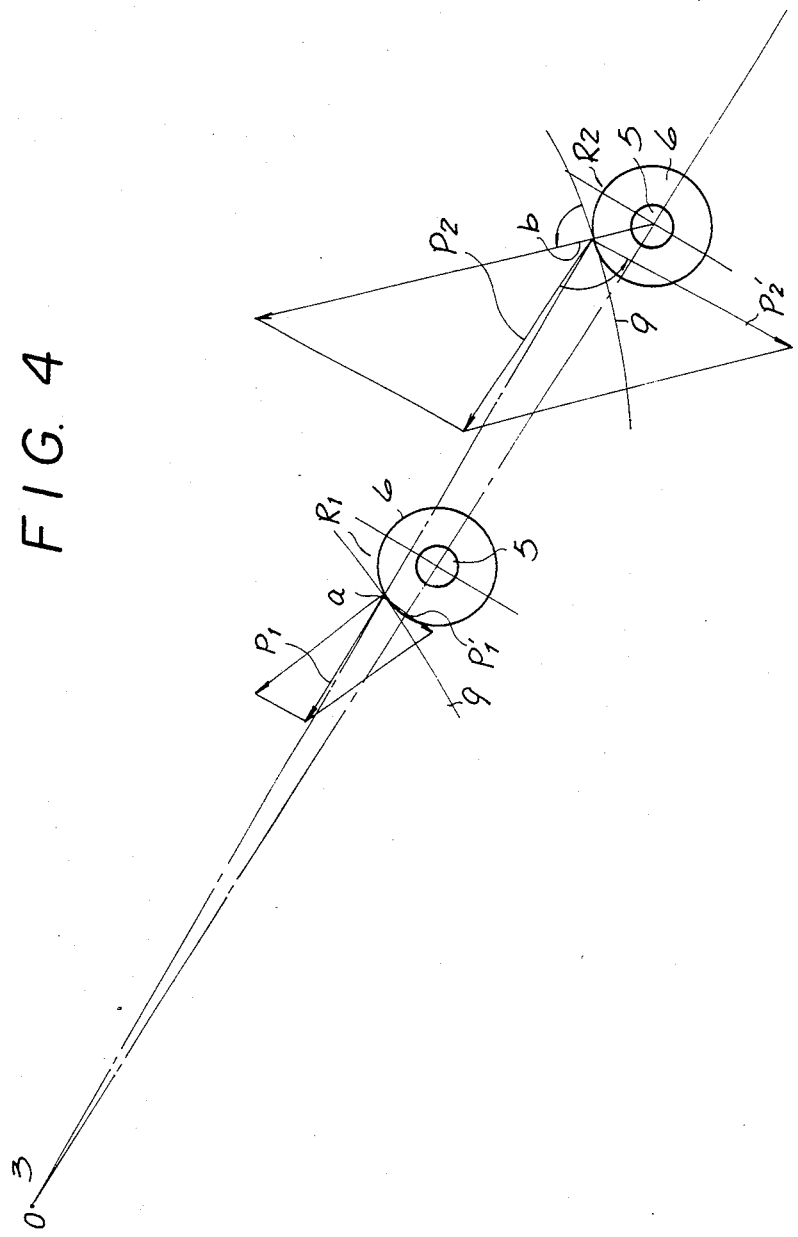
FIG. 4 is a diagrammatic view which shows a state of change of the spring torque according to the inclination of the movable member.

FIG. 3 and FIG. 4 illustrate the relation between the moment of rotation due to the weight of such television and the torque of spring. Namely, in a state of solid line R, in FIG. 3, the torque $T_1$ of the spring is product of a distance from the axis 3 (center of rotation) to the abutted portion a of cam surface 9 with rotor 6 and a component $P_1'$ of a spring force $P_1$, $$T_1 = Oa \times P_1'$$

This T is adapted to balance with the moment of rotation of the television. Further, the state $R_2$ in two points chain line of FIG. 2 is also the same. The torque $T_2$ of spring is as follows.

$$T_2 = Ob \times P_2' (P_2': \text{component of spring force } P_2)$$

In this state, the inclined angle of the television is large and the amount of rotation is also large accordingly the torque T of the spring becomes larger so much so that it may be balanced each other.

Accordingly, however changed the inclined angle of the television may be, the moment of the rotation is cancelled by the energized force (torque) of the spring and a stable state can be always maintained, thereby being capable of tilting the television with a small force of operation. Further, this inclination can be performed with nonstep.

Figure 5:
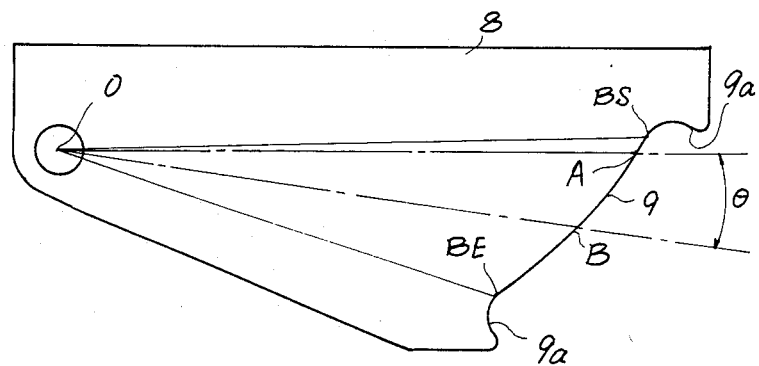
FIG. 5 is a side view when the cam is designed.

Then, FIG. 5 is a side view of an example of bracket 8 wherein such cam surface 9 as described above is formed. This cam surface 9 is designed according to the dimension of Table 1 described in the next page 6. In other words, supposing an angle between the standard line OA which connects the standard point A of the cam surface 9 with the central point O of the rotation of the movable member 2 and a designed line OB which connects an arbitrary point B on the cam surface with the central point O as $\theta$, the shape of the cam surface can be designed by changing the length of OB on said angle $\theta$. Further, both points ES are boundary points with stopper portion 9a which corresponds to a starting point of the movement and a finished point of the movement of the movable member 2 accompanying with the tilt of said movable member 2 respectively.

TABLE 1

| $\theta$ (deg) | $\overline{OB}$ (mm) |
| --- | --- |
| −1.56 | 100.00 BS |
| −0.59 | 98.85 |
| 0.38 | 97.70 |
| 1.35 | 96.56 |
| 2.33 | 95.42 |
| 3.30 | 94.28 |
| 4.28 | 93.15 |
| 5.25 | 92.03 |
| 6.22 | 90.92 |
| 7.20 | 89.81 |
| 8.18 | 88.71 |
| 9.16 | 87.62 |
| 10.14 | 86.55 |
| 11.13 | 85.50 |
| 12.12 | 84.45 |
| 13.11 | 83.42 |
| 14.11 | 82.41 |
| 15.11 | 81.43 |
| 16.13 | 80.46 |
| 17.16 | 79.52 |
| 18.19 | 78.62 BE |

Figure 7:
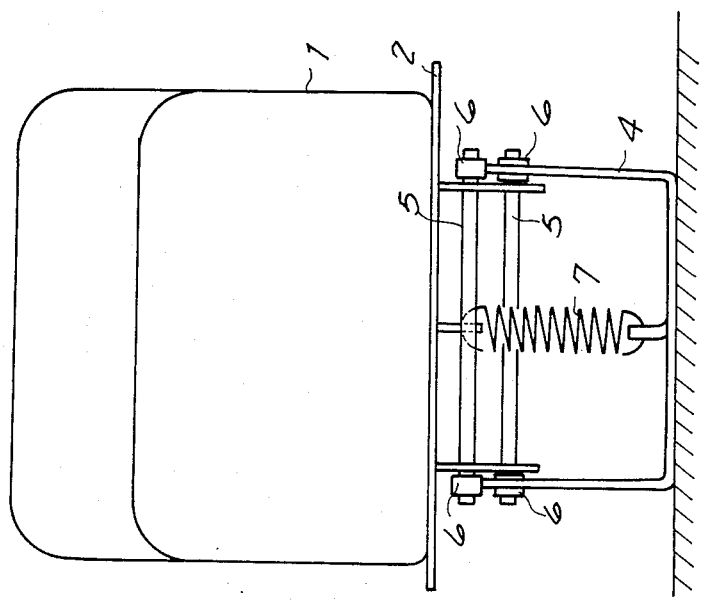
FIG. 6 and FIG. 7 are respectively a side and a rear view which show another embodiment of this invention.
Figure 6:
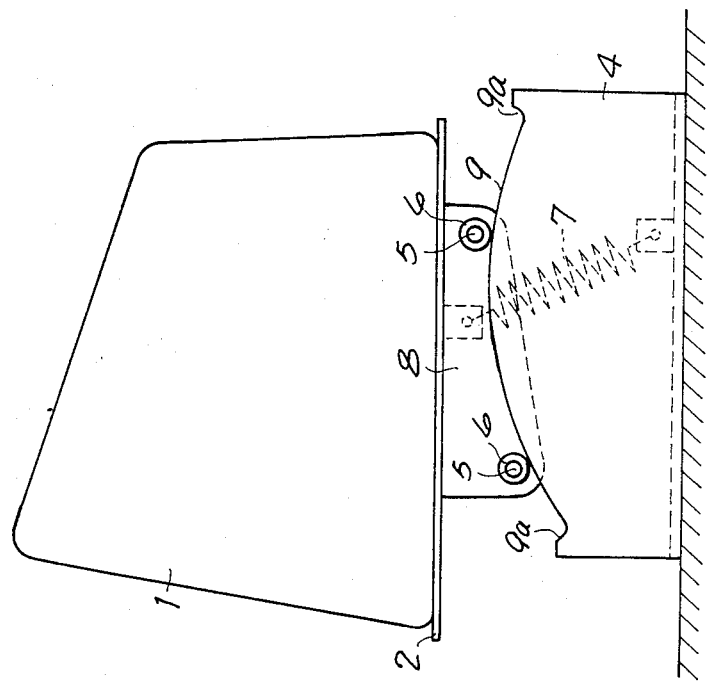

FIG. 6 and FIG. 7 are a side view and back view of another embodiment of this invention respectively, in which the same portions as the example described before correspond with the same symbols respectively. A cam surface 9 in this example is formed on the upper surfaces of a pair of standing walls and the rotor 6 abuts said cam surface 9 thereon. The rotor 6 is axially supported by the shaft 5 inserted into 2 positions at the front and the rear of the bracket 8 of the movable member 2.

In other words, the movable device of this example consists of the shaft 5 having both ends thereof inserted into the bracket 8 and rotors 6,6 axially supported by the both sides of the outer sides of the bracket 8 of the shaft 5. The spring 7 which energizes the rotor 6 in the direction of the cam surface 9 comprises one piece of coil spring, which is bridged between the lower portion of the base stand 4 and the lower portion of the movable member 2. Even in this example the shape of cam surface 9 is formed so that the moment of rotation may be balanced with the energized force of spring 7, thereby being adapted to maintain the balance at an arbitrary inclined angle.

Figure 8:
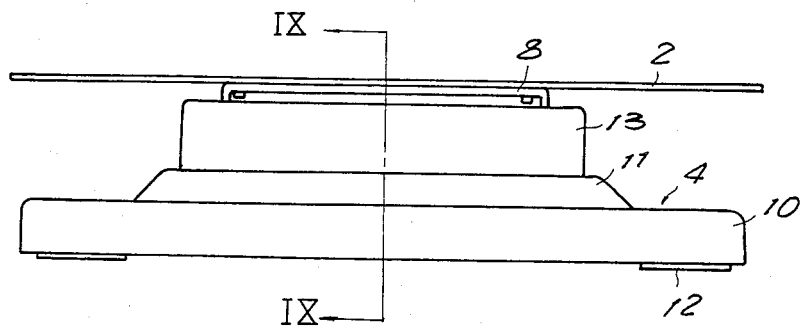
FIG. 8 and FIG. 9 are respectively a side and a rear view which show a further another embodiment of this invention and FIG. 10 is its exploded view.
Figure 9:
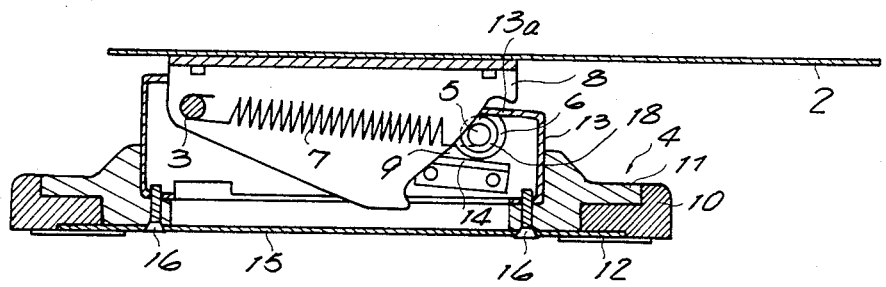

Then, FIG. 8 and FIG. 9 are an elevation view and its sectional area view in IX—IX line of further another example of this invention. In this example the base stand 4 consist of a fixed disc 10 at the outer circumferential side of said base side 4 and a rotary disc 11 rotatably inserted into said fixed disc being pasted with a cushion 12 made of rubber plate or the like at the lower surface thereof. A housing 13 is secured at the central portion of the rotary disc 11, said housing 13 containing a bracket 8 dangling from the lower surface of the movable member 2, an axis 3 which is a center of the rotation of the movable member 2, a shaft 5 axially support a rotor 6 which abuts to a cam surface 9 formed at bracket 8, and a pair of springs 7,7 which energizes the rotor 6 to the cam surface 9 respectively therein. Furthermore, bearings 18 are outwardly inserted at the both ends of the shaft 5, said each bearing 18 being provided between an inclined guide rail 14 screwed on the inner wall of the housing 13 and a ceiling portion 13a of the housing and being adapted to rotate abutting the guide rail 14.

In other words, the movable device of this example consists of the shaft 5 slidably installed to the front and the rear directions between the guide rail 14 and the ceiling surface 13a of the housing through bearings 18, 18 at both ends and the rotors 6,6 axially supported at the both sides of said shaft 5, said rotors 6,6 being adapted to abut respectively to a pair of cam surfaces 9,9 bridged between said axis 3 and the shaft 5. In FIG. 9, the numeral 15 is a rotary plate which pushes the fixed disc 10, and rotary disc 11 from the lower surface so that both discs may not draw out and regulates a rotary angle of the rotary disc 11 within a certain range, said rotary plate being fixedly secured to the rotary disc 11 with screws 16.

Figure 10:
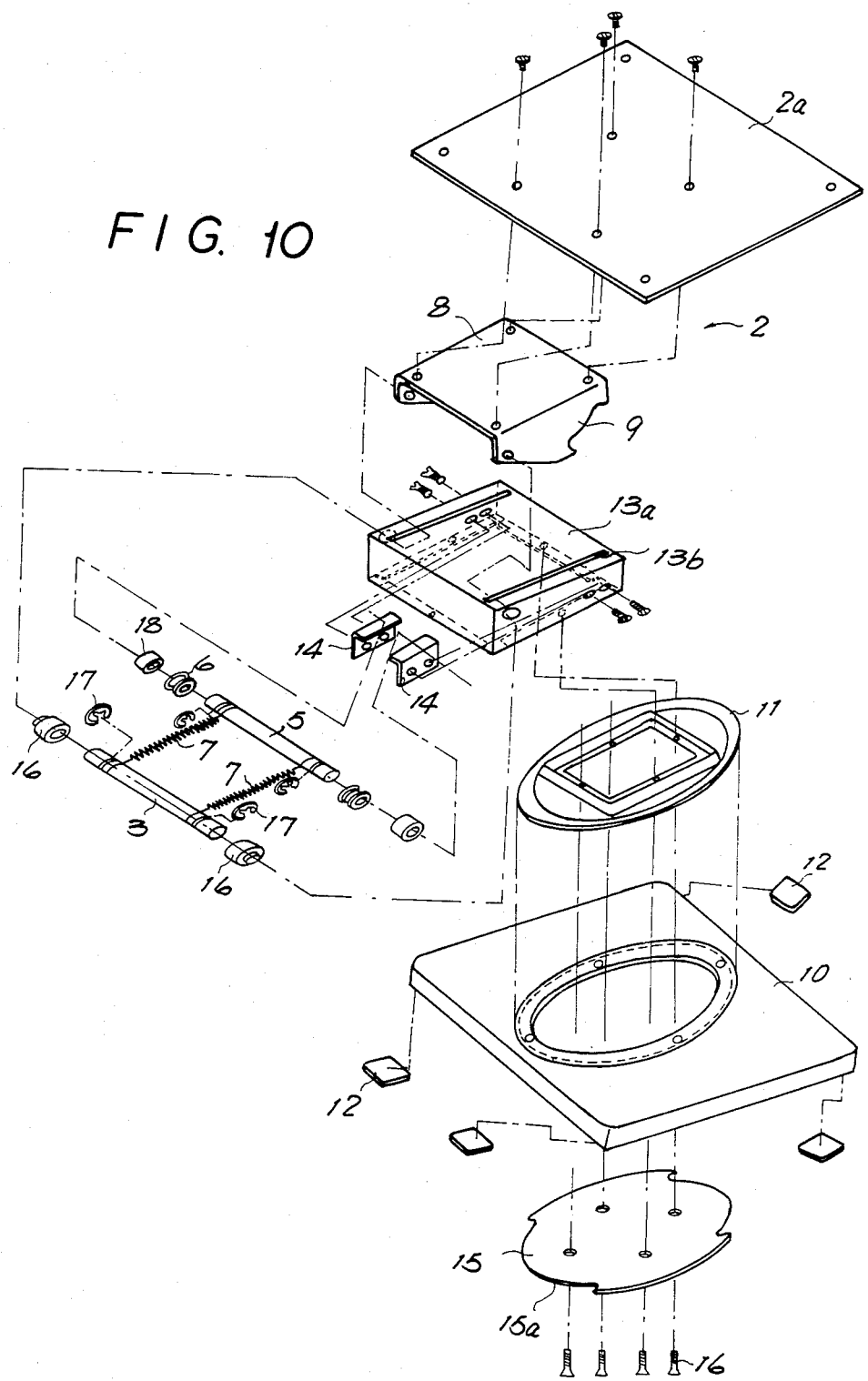

FIG. 10 is an exploded perspective view of the assembly of the television stand as shown such an example. Brackets 8,8 having ] type are screwed on the lower surface of a plate 2a put fixedly said television thereon, are screwed to form the movable member 2. Then the axis 3 is inserted into the bearing 16 secured to the inner wall of housing 13 in a state that the shaft 5 is connected with axis 3 through a pair of spring 7,7 and are fixed with E rings 17. In this case, cam rotors 6,6 abut to the cam surface 9 of the bracket 8 and the bearings 18,18 which roll along the guide rails 14,14 are respectively provided at both ends of the shaft, said rotors 6,6 and said bearings 18,18 being adapted to abut to the cam surface 9 and between the guide rail 14 and the ceiling surface portion 13a of the housing respectively. After insertion of said housing 13 into the rotation disc 11, said rotation disc 11 is adapted to mate with a fixed disc 10 and then the rotary plate 5 is adapted to abut thereto from the lower surface. The rotary plate 15, the rotary disc 11 and the housing 13 are integrally formed by screwing the screws 16 with the housing 13. In this case, around the outer circumferential surface of the rotary plate 15, a groove 15 is formed and at the fixed disc 10 stopper pins (not shown) which contact with said groove 15a are planted. The rotation of the rotation disc 11 is regulated within the range wherein the stopper pins abut to the both ends of the groove 15a.

Further, the numeral 13b of the housing is a slit inserted into the bracket 8.

Figure 12:
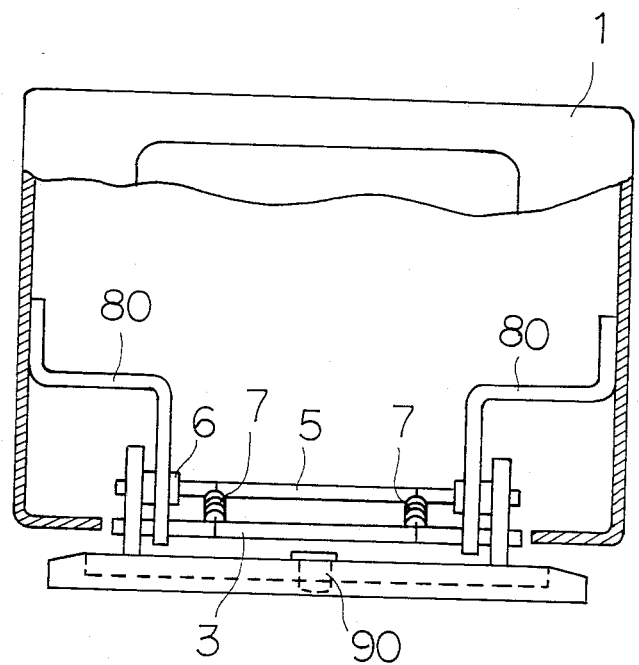
FIG. 12 is a partially broken rear view of the above example.

Each figure of FIGS. 11(a),11(b) and FIG. 12 shows the same example, which is the same structures as that of FIG. 1 and FIG. 2 other than the structure comprising the bracket 80 fixed to the inner wall of the television and the base stand 40 consisting of a fixed disc 41 of the outer circumferential side and a rotative disc 42 incorporated into said disc 41 rotatively. Accordingly, the same members as the examples described above are indicated with the same numerals.

The tilt operation of this example is the same as that of the example described above since these have the same structure. The television 1 tilts to the front and the rear due to the rotation of the bracket 80 with axis 3 as a center. In this case, the spring 7 expands and contracts according to the movement of the cam surface 9 at any inclined angle, whereby the same energized force (torque) as the moment of the rotation due to the weight of the television occurs to be balanced each other. Therefore, a stable state not in motion is maintained at an arbitrary position. FIG. 11(a) shows a mim. inclined angle of the television and a mim. torque state of the spring 7, while FIG. 11(b) shows a max. incline angle of the television and a max. torque state of the spring 7. In the figure, the numeral 90 is a rotational axis.

In this example, since it is not only possible to make the movable member 2 incline, but also enables to rotate said movable stand 2 in the horizontal plane, it is easy to fit to an operator's position and pose.

Further, this invention is not limited to the above examples, but many modifications are possible. For instance, in place of securing the roller to the moving device securing the slider which only slides is possible. Furthermore, the shape of cam surface is changeable suitably, and the use of compression spring is also possible.

According to this invention as described above, since the tilt mechanism of this invention is reformed so that the moment of the rotation due to the weight of television may be balanced with the energized force of spring according to the movable device, the tilt of the television can be regulated at an arbitrary angle and with no steps. Furthermore, since there is no use of friction force, the tilting operation can be performed with small force and the operation is also stable, a great practical effect can be obtained.

What we claim is:

1. A television stand comprising: a base stand, a movable member pivotably supported on said base stand for supporting a television, a tilt mechanism including a cam surface formed by one of said movable member and said base stand and a pressurized movable device abutting said cam surface for positioning of said movable member, and said can surface is formed so that the bias force of said movable device against said cam surface corresponds to a balanced force with respect to the moment of rotation due to the weight of said television.

2. A television stand according to claim 1 wherein the movable device is energized by a spring bridged between said movable device and a shaft which pivotably mounts the movable member on the base stand.

3. A television stad according to claim 1 wherein said cam surface is defined by said movable member and the movable base includes a guide slit in which the movable device is slidably inserted.

4. A television stand according to claim 1 wherein said cam surface includes stopper portions for stopping the movement of said movable device.

5. A television stand for supporting a television monitor at a desired position, said television stand comprising:
a base stand,
a movable member for supporting said television monitor,
tilt means for fixing said movable member with respect to said base stand, said tilt means including a cam surface defined by said movable member, a movable device slidably mounted in guide means defined by said base stand, a shaft mounted on said base stand and said movable member being pivotably mounted on said shaft, and a spring suspended between said movable device and said shaft for energizing said movable device so that said movable device abuts said cam surface and the position of abutment to the cam surface by said movable device changes according to the tilt of the movable member, said cam surface being shaped so that the energized force of the spring is balanced with a revolution moment of said movable member due to the weight of the television monitor, and said moveable member thereby is held at a desired position.

6. A television stand according to claim 5 wherein a guide slit forms said guide means and a rotor mounted on said movable device rotatably abuts against said cam surface.

7. A television stand according to claim 5 wherein a guide rail as a guide means is fixed on said base stand.

8. A television stand according to claim 5 wherein stopper members are formed at both ends of the cam surface for stopping the movement of said movable device.

9. A television stand according to claim 5 wherein the base stand consists of a fixed disk, a rotary plate inserted into this fixed disk rotatively in a horizontal direction, and a portion which secures the movable member attached to said rotary plate.

10. A television stand comprising:
    a base stand,
    a movable member,
    a television monitor mounted on said movable member,
    tilt means for fixing said movable member with respect to said base stand, said tilt means including a cam surface defined by said movable member, said movable device slidably mounted in guide means defined by said base stand, a shaft mounted on said base stand and said movable member being pivotably mounted on said shaft, and a spring suspended between said movable device and said shaft for energizing said movable device so that said movable device abuts said cam surface and the position of abutment to the cam surface by said movable device changes according to the tilt of the movable member, said cam surface being shaped so that the energized force of the spring is balanced with a revolution moment of said movable member due to the weight of the television monitor, and said movable member is thereby held at a desired position.

11. A television stand according to claim 10 wherein a guide slit forms said guide means and a rotor mounted on said movable device rotatably abuts against said cam surface.

12. A television stand according to claim 10 wherein said base stand is composed of a fixed disk, a rotation disk inlaid in said fixed disk horizontal-rotatably, and a member secures the movable member attached to the revolution disk.

* * * * *